US012763318B2

(12) United States Patent
Nakayama

(10) Patent No.: US 12,763,318 B2
(45) Date of Patent: Oct. 13, 2026

(54) NONAQUEOUS ELECTROLYTE SECONDARY BATTERY

(71) Applicant: TOYOTA JIDOSHA KABUSHIKI KAISHA, Toyota (JP)

(72) Inventor: Tetsuri Nakayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 16/126,311

(22) Filed: Sep. 10, 2018

(65) Prior Publication Data

US 2019/0081319 A1 Mar. 14, 2019

(30) Foreign Application Priority Data

Sep. 11, 2017 (JP) ................................ 2017-174333

(51) Int. Cl.
*H01M 4/36* (2006.01)
*H01M 4/505* (2010.01)
(Continued)

(52) U.S. Cl.
CPC ........... *H01M 4/364* (2013.01); *H01M 4/505* (2013.01); *H01M 4/525* (2013.01); *H01M 4/62* (2013.01);
(Continued)

(58) Field of Classification Search
CPC ......... H01M 4/02–62; H01M 10/0525; H01M 2004/028; H01M 10/4235
(Continued)

(56) References Cited

U.S. PATENT DOCUMENTS 5,962,167 A 10/1999 Nakai et al.
2004/0023115 A1* 2/2004 Kato .................. H01M 50/124 429/217

(Continued)

FOREIGN PATENT DOCUMENTS

CN 103988349 A 8/2014
JP 09-306547 A 11/1997

(Continued)

OTHER PUBLICATIONS

EPO English Machine Translations of JP 2013125732 originally published to Hayashi T on Jun. 24, 2013 (Year: 2013).*
English Translation of Sasaki WO2017098715 (Year: 2017).*

*Primary Examiner* — Niki Bakhtiari
(74) *Attorney, Agent, or Firm* — Sughrue Mion, PLLC

(57) ABSTRACT

Provided is a nonaqueous electrolyte secondary battery in which $Li_3PO_4$ is added to a positive electrode active material layer and which has excellent high-temperature storage characteristic. The nonaqueous electrolyte secondary battery disclosed herein includes a positive electrode, a negative electrode, and a nonaqueous electrolytic solution. The positive electrode includes a positive electrode active material layer. The positive electrode active material layer includes $Li_3PO_4$, $Li_2WO_4$, and, as a positive electrode active material, a lithium transition metal complex oxide including at least lithium, nickel, manganese, and cobalt. The mass ratio of $Li_3PO_4$ to the positive electrode active material is 1% by mass or more and 5% by mass or less. The mass ratio of $Li_2WO_4$ to the positive electrode active material is 0.2% by mass or more and 0.9% by mass or less.

3 Claims, 2 Drawing Sheets

(51) Int. Cl.

| | |
|---|---|
| ***H01M 4/525*** | (2010.01) |
| ***H01M 4/62*** | (2006.01) |
| ***H01M 10/0525*** | (2010.01) |
| ***H01M 10/42*** | (2006.01) |
| *H01M 4/02* | (2006.01) |

(52) U.S. Cl.
CPC ... *H01M 10/0525* (2013.01); *H01M 10/4235* (2013.01); *H01M 2004/028* (2013.01)

(58) Field of Classification Search
USPC .......................................................... 429/218
See application file for complete search history.

(56) References Cited

U.S. PATENT DOCUMENTS

| | | | | |
|---|---|---|---|---|
| 2011/0123865 | A1* | 5/2011 | Kepler | C03C 3/14 429/220 |
| 2014/0038062 | A1* | 2/2014 | Kawakami | H01M 10/056 429/338 |
| 2014/0329146 | A1* | 11/2014 | Niina | H01M 4/505 429/223 |
| 2015/0002101 | A1* | 1/2015 | Hasegawa | H01M 10/0525 320/136 |
| 2015/0021518 | A1 | 1/2015 | Kokado et al. | |
| 2016/0118692 | A1* | 4/2016 | Yamazaki | H01M 4/525 29/623.1 |
| 2017/0125795 | A1 | 5/2017 | Sugiura | |
| 2017/0141391 | A1* | 5/2017 | Jito | H01M 4/525 |
| 2018/0026305 | A1 | 1/2018 | Takada et al. | |
| 2019/0044179 | A1* | 2/2019 | Sugimori | H01M 4/364 |

FOREIGN PATENT DOCUMENTS

| | | | | | |
|---|---|---|---|---|---|
| JP | 10154532 | A | | 6/1998 | |
| JP | 2013125732 | A | * | 6/2013 | |
| JP | 2017-091664 | A | | 5/2017 | |
| KR | 1020140076618 | A | | 6/2014 | |
| WO | 2016/136210 | A1 | | 9/2016 | |
| WO | WO-2017098715 | A1 | * | 6/2017 | H01M 4/623 |
| WO | WO-2017150020 | A1 | * | 9/2017 | H01M 10/0525 |

* cited by examiner

NONAQUEOUS ELECTROLYTE SECONDARY BATTERY

BACKGROUND OF THE INVENTION

1. Field of the Invention

The present teaching relates to a nonaqueous electrolyte secondary battery. The present application claims priority based on Japanese Patent Application No. 2017-174333 filed on Sep. 11, 2017, the entire contents of which are incorporated herein by reference.

2. Description of the Related Art

In recent years, nonaqueous electrolyte secondary batteries such as lithium ion secondary batteries have been advantageously used as portable power sources for personal computers, mobile terminals and the like and driving power sources for vehicles such as electric vehicles (EV), hybrid vehicles (HV), and plug-in hybrid vehicles (PHV).

With the widespread use of nonaqueous electrolyte secondary batteries, further improvement in performance is desired. A technique of adding trilithium phosphate ($Li_3PO_4$) to the positive electrode active material layer in order to improve the performance of a nonaqueous electrolyte secondary battery is known (see, for example, Japanese Patent Application Publication No. H09-306547 and Japanese Patent Application Publication No. 2017-091664).

SUMMARY OF THE INVENTION

However, as a result of intensive research conducted by the inventor of the present teaching, it was found that the nonaqueous electrolyte secondary battery in which $Li_3PO_4$ has been added to a positive electrode active material layer has a problem that a capacity decreases in high-temperature storage.

In view of the above, an object of the present teaching is to provide a nonaqueous electrolyte secondary battery in which $Li_3PO_4$ is added to a positive electrode active material layer and which has an excellent high-temperature storage characteristic.

The nonaqueous electrolyte secondary battery disclosed herein includes a positive electrode, a negative electrode, and a nonaqueous electrolytic solution. The positive electrode includes a positive electrode active material layer. The positive electrode active material layer includes $Li_3PO_4$, $Li_2WO_4$, and, as a positive electrode active material, a lithium transition metal complex oxide including at least lithium, nickel, manganese, and cobalt. A mass ratio of $Li_3PO_4$ to the positive electrode active material is 1% by mass or more and 5% by mass or less. A mass ratio of $Li_2WO_4$ to the positive electrode active material is 0.2% by mass or more and 0.9% by mass or less.

When the mass ratio of $Li_3PO_4$ to the positive electrode active material is less than 1% by mass, the content of phosphorus in the coating film formed on the surface of the positive electrode active material becomes insufficient, and the amount of organic components in the coating film increases. As a result, the function of protecting the positive electrode active material demonstrated by the coating film is deteriorated, and the high-temperature storage characteristic is deteriorated. When the mass ratio of $Li_3PO_4$ to the positive electrode active material exceeds 5% by mass, the content of phosphorus in the coating film formed on the surface of the positive electrode active material becomes excessive, an inorganic component locally grows in the coating film, and compactness of the coating film is decreased. As a result, the high-temperature storage characteristic is deteriorated. When the mass ratio of $Li_2WO_4$ to the positive electrode active material is less than 0.2% by mass, the content of tungsten in the coating film becomes insufficient and the amount of organic component in the coating film increases. As a result, the function of protecting the positive electrode active material demonstrated by the coating film is deteriorated and the high-temperature storage characteristic is deteriorated. When the mass ratio of $Li_2WO_4$ to the positive electrode active material exceeds 0.9% by mass, the content of tungsten in the coating film formed on the surface of the positive electrode active material becomes excessive, an inorganic component locally grows in the coating film, and compactness of the coating film is decreased. As a result, the high-temperature storage characteristic is deteriorated.

Therefore, by adequately controlling the content of $Li_3PO_4$ and the content of $Li_2WO_4$, it is possible to form a dense coating film having ion conductivity (in particular, conductivity of ions serving as charge carriers) on the surface of the positive electrode active material and to suppress deterioration of the positive electrode active material in high-temperature storage. Therefore, with such features, it is possible to provide a nonaqueous electrolyte secondary battery in which $Li_3PO_4$ is added to a positive electrode active material layer and which has an excellent high-temperature storage characteristic.

In a desired embodiment of the nonaqueous electrolyte secondary battery disclosed herein, a content of nickel with respect to a total content of nickel, manganese, and cobalt in the lithium transition metal composite oxide is 34 mol % or more.

Because of such a feature, the electric resistance of the nonaqueous electrolyte secondary battery decreases and the capacity increases.

In a desired embodiment of the nonaqueous electrolyte secondary battery disclosed herein, $Li_3PO_4$ is in a particulate shape with an average particle diameter of 10 μm or less.

In this case, $Li_3PO_4$ is likely to decompose uniformly during the formation of the coating film, compactness of the coating film formed can be increased, and the high-temperature storage characteristic of the nonaqueous electrolyte secondary battery can be further improved.

DESCRIPTION OF THE PREFERRED EMBODIMENT

Figure 1:
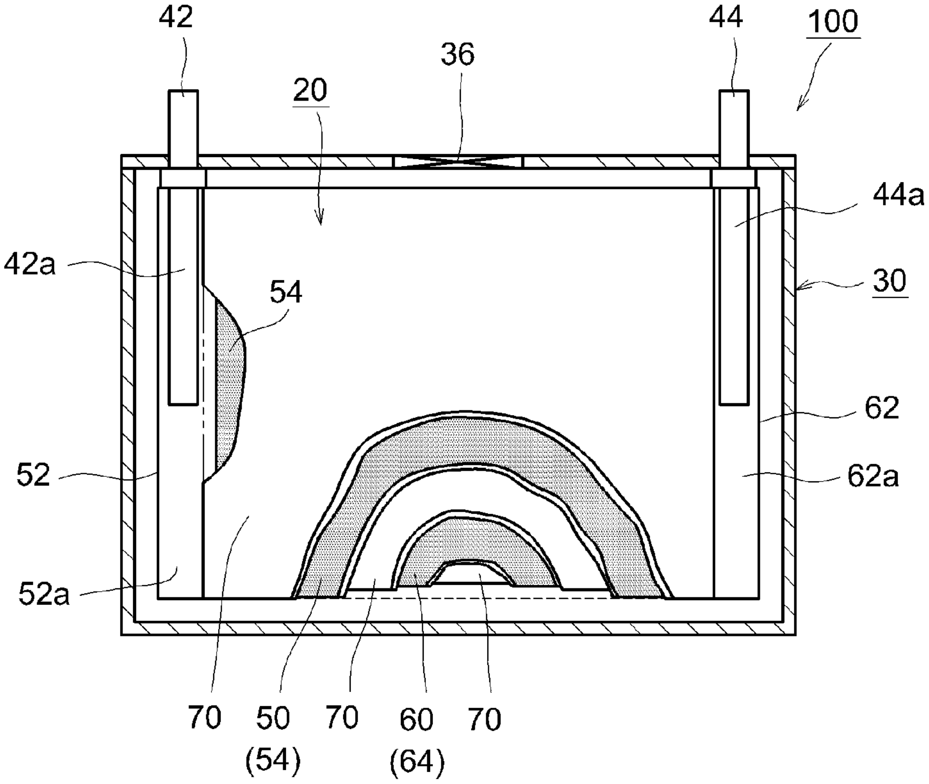
FIG. 1 is a cross-sectional view schematically showing the internal structure of a lithium ion secondary battery according to one embodiment of the present teaching.

Embodiments of the present teaching will be described below with reference to the drawings. Incidentally, the matters other than those specifically mentioned in the present specification and necessary for the implementation of the present teaching (for example, the general configuration and production process of a nonaqueous electrolyte secondary battery not characterizing the present teaching) can be understood as design matters to be addressed by a person skilled in the art on the basis of the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

In this specification, the term "secondary battery" generally refers to a power storage device that can be repeatedly charged and discharged, and this term is inclusive of power storage elements such as a so-called power storage battery and an electric double layer capacitor.

Further, the term "nonaqueous electrolyte secondary battery" refers to a battery including a nonaqueous electrolytic solution (typically, a nonaqueous electrolytic solution including a supporting electrolyte in a nonaqueous solvent).

Hereinafter, the present teaching will be described in detail by taking a flat angular lithium ion secondary battery having a flat-shaped wound electrode body and a flat-shaped battery case as an example, but the present teaching is not intended to be limited to the configuration described in the embodiment.

A lithium ion secondary battery 100 shown in FIG. 1 is a sealed battery constructed by accommodating a flat-shaped wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection and a thin safety valve 36 which is set so as to release an internal pressure when the internal pressure of the battery case 30 rises to a predetermined level or higher. In addition, an injection port (not shown) for injecting the nonaqueous electrolytic solution is provided in the battery case 30. The positive electrode terminal 42 is electrically connected to the positive electrode current collector plate 42*a*. The negative electrode terminal 44 is electrically connected to the negative electrode current collector plate 44*a*. As a material of the battery case 30, for example, a lightweight metal material having good thermal conductivity such as aluminum is used.

Figure 2:
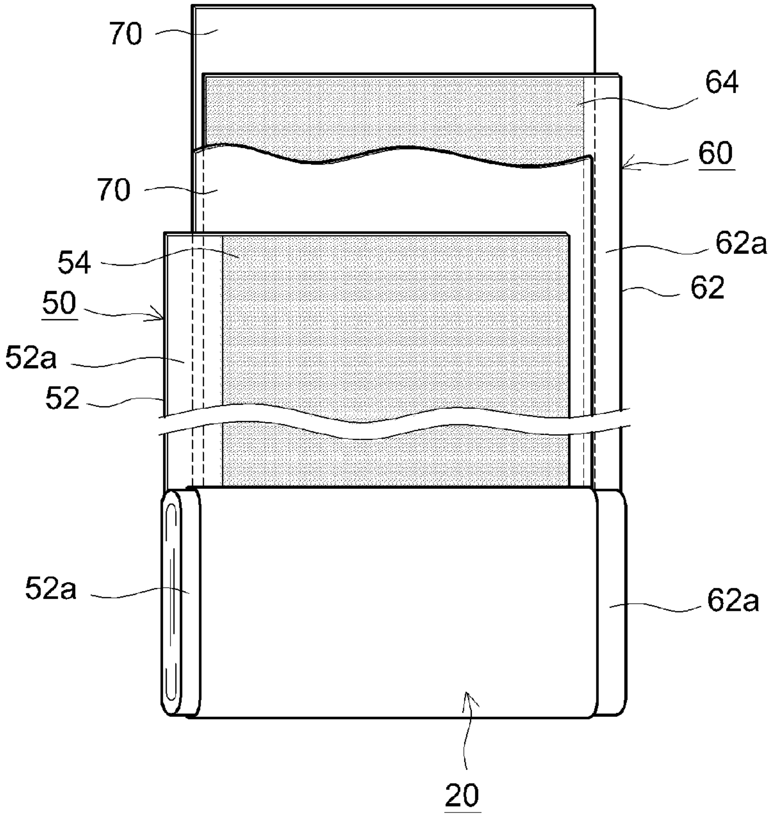
FIG. 2 is a schematic view showing the configuration of a wound electrode body of a lithium ion secondary battery according to one embodiment of the present teaching.

As shown in FIGS. 1 and 2, the wound electrode body 20 has a structure obtained by laminating a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode current collector 62, with two elongated separator sheets 70 being interposed therebetween, and winding the laminate in the longitudinal direction. A positive electrode active material layer non-formation portion 52*a* (that is, a portion where the positive electrode active material layer 54 is not formed and the positive electrode current collector 52 is exposed) and a negative electrode active material layer non-formation portion 62*a* (that is, a portion where the negative electrode active material layer 64 is not formed and the negative electrode current collector 62 is exposed), which are formed to protrude to the outside from both ends of the wound electrode body 20 in the winding axis direction (that is, a sheet width direction orthogonal to the longitudinal direction) are joined to a positive electrode current collector plate 42*a* and a negative electrode current collector plate 44*a*, respectively.

The positive electrode current collector 52 constituting the positive electrode sheet 50 is exemplified by an aluminum foil or the like.

The positive electrode active material layer 54 includes $Li_3PO_4$, $Li_2WO_4$, and a positive electrode active material.

$Li_3PO_4$ is a component contributing to the formation of a coating film on the surface of the active material, and the coating film which is formed includes phosphorus atoms derived from $Li_3PO_4$.

$Li_3PO_4$ is present as a distinct substance without solid-phase mixing with the positive electrode active material or $Li_2WO_4$. $Li_3PO_4$ is typically present as particles separate from the positive electrode active material and $Li_2WO_4$.

$Li_3PO_4$ is desirably in a particulate shape with an average particle diameter of 10 μm or less. In this case, $Li_3PO_4$ is likely to decompose uniformly during the formation of the coating film, compactness of the coating film formed can be increased, and the high-temperature storage characteristic of the lithium ion secondary battery 100 can be further improved. Meanwhile, from the viewpoint of preventing excessive decomposition of $Li_3PO_4$ due to the increase in specific surface area, it is desirable that $Li_3PO_4$ be in a particulate shape with an average particle diameter of 1 μm or more.

The average particle diameter of $Li_3PO_4$ can be measured, for example, as a value of the particle diameter (D50) at 50% accumulation from a fine particle side in a cumulative particle size distribution curve obtained by a laser diffraction-scattering method using N-methyl pyrrolidone for a solvent.

$Li_2WO_4$ is a component contributing to the formation of a coating film on the surface of the active material, and the coating film which is formed includes tungsten atoms derived from $Li_2WO_4$.

$Li_2WO_4$ is present as a distinct substance without solid-phase mixing with the positive electrode active material or $Li_3PO_4$. $Li_2WO_4$ is typically present as particles separate from the positive electrode active material and $Li_3PO_4$.

When $Li_2WO_4$ is in a particulate shape, the average particle diameter thereof is not particularly limited, and it is desirable that $Li_2WO_4$ have a surface area such that decomposition for formation of the coating film occurs appropriately. Accordingly, the average particle diameter of $Li_2WO_4$ is desirably 0.01 μm or more and 15 μm or less, and more desirably 0.1 μm or more and 12 μm or less.

The average particle diameter of $Li_2WO_4$ can be measured by, for example, a laser diffraction-scattering method using N-methyl pyrrolidone as a solvent.

A lithium transition metal composite oxide including at least lithium, nickel, manganese, and cobalt is used as a positive electrode active material. Thus, in the present embodiment, a lithium-nickel-manganese-cobalt-based composite oxide is used as the positive electrode active material. The lithium-nickel-manganese-cobalt-based composite oxide desirably has a layered rock salt type structure.

The content of nickel with respect to the total content of nickel, manganese, and cobalt in the lithium-nickel-manganese-cobalt-based composite oxide is not particularly limited, but is desirably 34 mol % or more. In this case, the electric resistance of the lithium ion secondary battery 100 decreases and the capacity increases. From the viewpoint of not lowering the performance of the lithium-nickel-manganese-cobalt-based composite oxide as the positive electrode active material, the content of nickel with respect to the total content of nickel, manganese, and cobalt is desirably 60 mol % or less.

The lithium-nickel-manganese-cobalt-based composite oxide may further include a metal element other than lithium, nickel, manganese, and cobalt (for example, Zr, Mo, W, Mg, Ca, Na, Fe, Cr, Zn, Si, Sn, Al, and the like).

A lithium-nickel-manganese-cobalt-based composite oxide represented by a following Formula (I) can be advantageously used as the positive electrode active material.

$$Li_aNi_xMn_yCo_zO_2 \quad (I)$$

Here, a satisfies $0.98 \leq a \leq 1.20$; x, y and z satisfy $x+y+z=1$; x desirably satisfies $0.20 \leq x \leq 0.60$, and more desirably $0.34 \leq x \leq 0.60$; y desirably satisfies $0<y \leq 0.50$, and more desirably $0<y \leq 0.40$; and z desirably satisfies $0<z \leq 0.50$, and more desirably $0<z \leq 0.40$.

The positive electrode active material layer 54 may further include a positive electrode active material other than the lithium-nickel-manganese-cobalt-based composite oxide within a range in which the effect of the present teaching is not impaired.

The content of the positive electrode active material is desirably 70% by mass or more, and more desirably 75% by mass or more in the positive electrode active material layer 54 (that is, with respect to the total mass of the positive electrode active material layer 54).

In the present embodiment, the mass ratio of $Li_3PO_4$ to the positive electrode active material is 1% by mass or more and 5% by mass or less.

Where the mass ratio of $Li_3PO_4$ to the positive electrode active material is less than 1% by mass, the content of phosphorus in the coating film formed on the surface of the positive electrode active material is insufficient and the amount of organic component in the coating film increases. As a result, the function of protecting the positive electrode active material demonstrated by the coating film is decreased and the high-temperature storage characteristic deteriorates. Where the mass ratio of $Li_3PO_4$ to the positive electrode active material exceeds 5% by mass, the content of phosphorus in the coating film formed on the surface of the positive electrode active material becomes excessive, an inorganic component locally grows in the coating film, and compactness of the coating film is decreased. As a result, the high-temperature storage characteristic deteriorates.

The mass ratio of $Li_3PO_4$ to the positive electrode active material is desirably 1.5% by mass or more and 4.5% by mass or less, and more desirably 2% by mass or more and 4% by mass or less.

In the present embodiment, the mass ratio of $Li_2WO_4$ to the positive electrode active material is 0.2% by mass or more and 0.9% by mass or less.

Where the mass ratio of $Li_2WO_4$ to the positive electrode active material is less than 0.2% by mass, the content of tungsten in the coating film is insufficient and the amount of organic component in the coating film increases. As a result, the function of protecting the positive electrode active material demonstrated by the coating film is decreased and high-temperature storage characteristic deteriorates. Where the mass ratio of $Li_2WO_4$ to the positive electrode active material exceeds 0.9% by mass, the content of tungsten in the coating film formed on the surface of the positive electrode active material becomes excessive, an inorganic component locally grows in the coating film, and compactness of the coating film is decreased. As a result, the high-temperature storage characteristic deteriorates.

The mass ratio of $Li_2WO_4$ to the positive electrode active material is desirably 0.25% by mass or more and 0.85% by mass or less, and more desirably 0.3% by mass or more and 0.75% by mass or less.

The positive electrode active material layer 54 may include components other than $Li_3PO_4$, $Li_2WO_4$, and the positive electrode active material. Examples thereof include a conductive material, a binder, and the like.

For example, carbon black such as acetylene black (AB) or other carbon materials (for example, graphite or the like) can be advantageously used as the conductive material. The content of the conductive material in the positive electrode active material layer 54 is desirably 1% by mass or more and 15% by mass or less, and more desirably 3% by mass or more and 12% by mass or less.

For example, polyvinylidene fluoride (PVdF) or the like can be used as the binder. The content of the binder in the positive electrode active material layer 54 is desirably 1% by mass or more and 15% by mass or less, and more desirably 2% by mass or more and 12% by mass or less.

In the positive electrode active material layer 54, the positive electrode active material, $Li_3PO_4$, and $Li_2WO_4$ may be dispersed (particularly uniformly) as separate particles, or either one of or both of $Li_3PO_4$ particles and $Li_2WO_4$ particles may be attached to the surface of the positive electrode active material particles. Further, when a conductive material is used, either one of or both of $Li_3PO_4$ particles and $Li_2WO_4$ particles may be attached to the surface of the conductive material.

The positive electrode active material layer 54 is formed by preparing a paste for forming the positive electrode active material layer, which contains a positive electrode active material, $Li_3PO_4$, $Li_2WO_4$, and optional components, coating the paste on the positive electrode current collector 52, drying, and then pressing as necessary. A method for preparing the paste for forming the positive electrode active material layer is not particularly limited. For example, a paste can be prepared by adding a positive electrode active material, $Li_3PO_4$, $Li_2WO_4$, and optional components to a solvent (for example, N-methyl pyrrolidone) and mixing. A paste may also be prepared by coating the surface of the positive electrode active material particles with either one of or both of $Li_3PO_4$ particles and $Li_2WO_4$ particles and then mixing with other components and a solvent. Further, a paste may also be prepared by coating the surface of conductive material particles with either one of or both of $Li_3PO_4$ particles and $Li_2WO_4$ particles and then mixing with other components and a solvent.

The negative electrode current collector 62 constituting the negative electrode sheet 60 can be exemplified by a copper foil or the like. For example, a carbon material such as graphite, hard carbon, soft carbon or the like can be used as the negative electrode active material to be included in the negative electrode active material layer 64. The graphite may be natural graphite or artificial graphite, and may be amorphous carbon-coated graphite in which graphite is coated with an amorphous carbon material. The negative electrode active material layer 64 may include components other than the active material, such as a binder and a thickener. For example, styrene butadiene rubber (SBR) or the like can be used as the binder. For example, carboxymethyl cellulose (CMC) or the like can be used as the thickener.

The content of the negative electrode active material in the negative electrode active material layer is desirably 90% by mass or more, and more desirably 95% by mass or more and 99% by mass or less. The content of the binder in the negative electrode active material layer is desirably 0.1% by mass or more and 8% by mass or less, and more desirably 0.5% by mass or more and 3% by mass or less. The content of the thickener in the negative electrode active material layer is desirably 0.3% by mass or more and 3% by mass or less, and more desirably 0.5% by mass or more and 2% by mass or less.

The separator 70 can be exemplified a porous sheet (film) made of a resin such as polyethylene (PE), polypropylene (PP), a polyester, cellulose, a polyamide and the like. Such a porous sheet may have a single layer structure or a laminate structure of two or more layers (for example, a three layer structure in which a PP layer is laminated on both surfaces of a PE layer). A heat-resistant layer (HRL) may be provided on the surface of the separator 70.

The nonaqueous electrolytic solution typically includes a nonaqueous solvent and a supporting salt.

As the nonaqueous solvent, an organic solvent such as various carbonates, ethers, esters, nitriles, sulfones, lactones and the like usable for an electrolytic solution of a general lithium ion secondary battery can be used without particular limitation. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. Such nonaqueous solvents may be used singly or in appropriate combination of two or more thereof.

As the supporting salt, for example, a lithium salt such as $LiPF_6$, $LiBF_4$, $LiClO_4$ or the like (desirably $LiPF_6$) can be used. The concentration of the supporting salt is desirably 0.7 mol/L or more and 1.3 mol/L or less.

As long as the effect of the present teaching is not remarkably impaired, the nonaqueous electrolytic solution may include components other than the above-mentioned components, for example, various additives such as a coating film formation agent; a gas generating agent such as biphenyl (BP), cyclohexylbenzene (CHB), a thickener, and the like.

In the related art, only $Li_3PO_4$ is added to the positive electrode active material layer. In the lithium ion secondary battery 100 in which $Li_3PO_4$ is added to the positive electrode active material layer, $Li_3PO_4$ is slightly decomposed in repeated charging and discharging, and a coating film derived from $Li_3PO_4$ is formed on the surface of the positive electrode active material. In the related art, the high-temperature storage characteristic is insufficient and the composition of the coating film derived from the $Li_3PO_4$ conceivably affects the high-temperature performance characteristic.

By contrast in the present embodiment, since $Li_3PO_4$ and $Li_2WO_4$ are present as components contributing to the formation of the coating film, they are both decomposed, and a coating film derived from $Li_3PO_4$ and $Li_2WO_4$ and including phosphorus atoms and tungsten atoms is densely formed due to some sort of interaction (supposedly, an extremely fine coating film is formed in which an organic compound and an inorganic compound in which Li, P, W, and O are combined together are adequately arranged).

Therefore, by using a lithium-nickel-manganese-cobalt-based composite oxide for a positive electrode active material and adequately controlling the content of $Li_3PO_4$ and the content of $Li_2WO_4$, as described hereinabove, it is possible to form a dense coating film including phosphorus atoms and tungsten atoms and having high ion conductivity (in particular, the conductivity of ions serving as charge carriers) on the surface of the positive electrode active material and to suppress the deterioration of the positive electrode active material at the time of high-temperature storage. Thus, by combining a specific amount of $Li_3PO_4$ and a specific amount of $Li_2WO_4$, it is possible to provide the lithium ion secondary battery 100 with excellent high-temperature storage characteristic (in particular, excellent resistance to capacity deterioration during high-temperature storage).

The lithium ion secondary battery 100 configured as described above can be used for various purposes. Suitable applications include a driving power supply installed on a vehicle such as an electric vehicle (EV), a hybrid vehicle (HV), a plug-in hybrid vehicle (PHV), or the like. Typically, the lithium ion secondary battery 100 can also be used in the form of a battery pack in which a plurality of lithium ion secondary batteries 100 is connected in series and/or in parallel.

The rectangular lithium ion secondary battery 100 including the flat-shaped wound electrode body 20 has been described hereinabove by way of example. However, the nonaqueous electrolyte secondary battery disclosed herein can also be configured as a lithium ion secondary battery including a stacked electrode body. Further, the nonaqueous electrolyte secondary battery disclosed herein can also be configured as a cylindrical lithium ion secondary battery. The nonaqueous electrolyte secondary battery disclosed herein can also be configured as a nonaqueous electrolyte secondary battery other than the lithium ion secondary battery.

Hereinafter, examples relating to the present teaching will be described, but the present teaching is not intended to be limited to the configurations shown in the examples.

Preparation of Evaluation Lithium Ion Secondary Batteries A1 to A5 and B1 to B7

$LiNi_{0.34}Co_{0.33}Mn_{0.33}O_2$ (LNCM) with a layered rock-salt type structure as a positive electrode active material, $Li_3PO_4$ having an average particle diameter shown in Table 1, $Li_2WO_4$ having an average particle diameter of 10 μm, acetylene black (AB) as a conductive material, and polyvinylidene fluoride (PVdF) as a binder were mixed with N-methyl-2-pyrrolidone (NMP) at a mass ratio of LNCM:$Li_3PO_4$:$Li_2WO_4$:AB:PVdF=100:q:r:13:13 (q and r are values shown in Table 1) to prepare a paste for forming a positive electrode active material layer. This paste was coated on an aluminum foil and dried to form a positive electrode active material layer. Subsequently, press treatment was performed to prepare a positive electrode sheet.

Further, natural graphite (C) as a negative electrode active material, styrene butadiene rubber (SBR) as a binder, and carboxymethyl cellulose (CMC) as a thickener were mixed with ion exchanged water at a ratio of C:SBR:CMC=98:1:1 to prepare a paste for forming a negative electrode active material layer. This paste was coated on a copper foil, dried, and pressed to prepare a negative electrode sheet.

A porous polyolefin sheet was prepared as a separator sheet.

A mixed solvent including ethylene carbonate (EC), ethyl methyl carbonate (EMC) and dimethyl carbonate (DMC) at a volume ratio of 1:1:1 was prepared, and $LiPF_6$ as a supporting salt was dissolved to a concentration of 1.0 mol/L to prepare a nonaqueous electrolytic solution.

The evaluation lithium ion secondary batteries A1 to A5 and B1 to B7 were prepared using the positive electrode sheet, the negative electrode sheet, the separator, and the nonaqueous electrolytic solution.

Evaluation of High-temperature Storage Characteristic

Each prepared evaluation lithium ion secondary battery was adjusted to state of charge (SOC) 80%, and then stored for 10 days in a high-temperature oven set at 55° C. After that, two cycles of charging and discharging were carried out with a current value of 1 C, and the discharge capacity at the second cycle was obtained. Then, for each evaluation lithium ion secondary battery, the ratio of the discharge capacity was calculated by taking the predetermined reference value of the discharge capacity as 100. The results are shown in Table 1.

TABLE 1

| Battery No. | Content (% by mass) $Li_3PO_4$ (q) | $Li_2WO_4$ (r) | Average particle diameter of $Li_3PO_4$ (μm) | High-temperature storage characteristic (capacity ratio) |
|---|---|---|---|---|
| A1 | 1 | 0.2 | 10 | 111 |
| A2 | 5 | 0.2 | 11 | 107 |
| A3 | 1 | 0.9 | 10 | 116 |
| A4 | 5 | 0.9 | 10 | 109 |
| A5 | 3 | 0.5 | 10 | 122 |
| B1 | 0.5 | 1 | 11 | 95 |
| B2 | 0.5 | 0.1 | 11 | 91 |
| B3 | 6 | 1 | 10 | 96 |
| B4 | 6 | 0.1 | 11 | 86 |
| B5 | 3.5 | 0 | 11 | 82 |
| B6 | 0 | 1.2 | 11 | 79 |
| B7 | 0 | 0.6 | 11 | 76 |

From the results shown in Table 1, it is understood that when a lithium-nickel-manganese-cobalt-based composite oxide is used as a positive electrode active material in a lithium ion secondary battery in which $Li_3PO_4$ is added to a positive electrode active material layer, the mass ratio of $Li_3PO_4$ to the positive electrode active material is 1% by mass or more and 5% by mass or less, and the mass ratio of $Li_2WO_4$ to the positive electrode active material is 0.2% by mass or more and 0.9% by mass or less, a decrease in capacity during storage at high temperature is suppressed.

Therefore, it is understood that the nonaqueous electrolyte secondary battery disclosed herein has excellent high-temperature storage characteristic.

Although specific examples of the present teaching have been described in detail above, these are merely illustrative and do not limit the scope of the claims. Techniques described in the claims include those in which the concrete examples exemplified hereinabove are variously modified and changed.

What is claimed is:

1. A nonaqueous electrolyte secondary battery comprising a positive electrode, a negative electrode, a battery case, a positive electrode terminal, a negative electrode terminal, a safety valve and a nonaqueous electrolytic solution, wherein the battery case is a flat angular battery case, the positive electrode terminal, the negative electrode terminal, and the safety valve are provided on a same face of the battery case, the positive electrode includes a positive electrode active material layer;

the positive electrode active material layer includes $Li_3PO_4$, $Li_2WO_4$, and, as a positive electrode active material, a lithium transition metal complex oxide including at least lithium, nickel, manganese, and cobalt;

a mass ratio of $Li_3PO_4$ to the positive electrode active material is 1% by mass or more and 3% by mass or less;

a mass ratio of $Li_2WO_4$ to the positive electrode active material is 0.5% by mass or more and 0.9% by mass or less;

an average particle diameter of the $Li_3PO_4$ is 1 μm or more and 10 μm or less;

an average particle diameter of the $Li_2WO_4$ is 0.01 μm or more and less than 0.1 μm;

the lithium transition metal composite oxide is represented by a following Formula (I):

$$Li_aNi_xMn_yCo_zO_2 \quad (I),$$

wherein, in Formula (I), a satisfies $0.98 \leq a \leq 1.20$; x, y, and z satisfy $x+y+z=1$; x satisfies $0.20 \leq x \leq 0.60$; y satisfies $0<y \leq 0.50$; and z satisfies $0<z \leq 0.50$;

the negative electrode includes a negative electrode active material layer;

the negative electrode active material layer includes a negative electrode active material, a binder, and a thickener;

the negative electrode active material of the negative electrode active material layer consists essentially of graphite;

a content of the graphite in the negative electrode active material layer is 95% by mass or more and 99% by mass or less, the binder includes styrene butadiene rubber;

a content of the styrene butadiene rubber in the negative electrode active material layer is 0.5% by mass or more and 3% by mass or less, the thickener includes carboxymethyl cellulose, and a coating film derived from decomposition of both $Li_3PO_4$ and $Li_2WO_4$ and including phosphorus atoms and tungsten atoms is formed on the positive electrode active material.

2. The nonaqueous electrolyte secondary battery according to claim 1, wherein x satisfies $0.34 \leq x \leq 0.60$.

3. The nonaqueous electrolyte secondary battery according to claim 1, wherein the $Li_2WO_4$ is present as particles separate from the positive electrode active material and the $Li_3PO_4$.

* * * * *